(12) United States Patent
Huang et al.

(10) Patent No.: US 7,914,701 B2
(45) Date of Patent: Mar. 29, 2011

(54) LATERAL FLOW DIAGNOSTIC DEVICE THAT CONTAINS A PHOSPHORESCENT MATERIAL ENCAPSULATED IN A CROSSLINKED POLYMER MATRIX

(75) Inventors: Lei Huang, Duluth, GA (US); Xuedong Song, Roswell, GA (US); Bin Wu, Foxboro, MA (US); Rosann Marie Kaylor, Cumming, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 472 days.

(21) Appl. No.: 11/772,499

(22) Filed: Jul. 2, 2007

(65) Prior Publication Data

US 2009/0127509 A1    May 21, 2009

Related U.S. Application Data

(62) Division of application No. 10/879,933, filed on Jun. 29, 2004, now Pat. No. 7,238,301.

(51) Int. Cl.
*G01N 33/533* (2006.01)
(52) U.S. Cl. ............. 252/301.16; 422/82.08; 435/287.1; 435/287.2; 436/531; 436/532; 436/172
(58) Field of Classification Search ............. 252/301.16, 252/301.36, 301.35; 428/407; 435/287.1, 435/287.2; 422/82.08; 436/531, 532.172
See application file for complete search history.

(56) References Cited

U.S. PATENT DOCUMENTS

| | | | |
|---|---|---|---|
| 2,650,169 A | 8/1953 | Goldstein | |
| 3,687,863 A | 8/1972 | Wacher | |
| 4,452,861 A | 6/1984 | Okamoto et al. | |
| 4,640,797 A | 2/1987 | Goguen | |
| 4,781,647 A | 11/1988 | Doane, Jr. | |
| 5,152,287 A * | 10/1992 | Kane ............................ | 600/364 |
| 5,464,741 A | 11/1995 | Hendrix | |
| 5,589,194 A | 12/1996 | Tsuei et al. | |
| 5,698,301 A | 12/1997 | Yonetani | |
| 5,786,219 A | 7/1998 | Zhang et al. | |
| 5,922,537 A | 7/1999 | Ewart et al. | |
| 5,977,241 A | 11/1999 | Koloski et al. | |
| 6,004,530 A | 12/1999 | Sagner et al. | |
| 6,232,386 B1 | 5/2001 | Vargo et al. | |
| 6,375,864 B1 | 4/2002 | Phillips et al. | |
| 6,562,460 B1 | 5/2003 | Bayless | |
| 6,582,930 B1 | 6/2003 | Ponomarev et al. | |
| 6,608,129 B1 | 8/2003 | Koloski et al. | |
| 6,653,654 B1 | 11/2003 | Che | |
| 6,756,120 B2 | 6/2004 | Smith et al. | |
| 6,770,220 B1 | 8/2004 | Klimant | |
| 2003/0108911 A1 | 6/2003 | Klimant et al. | |
| 2005/0142371 A1 | 6/2005 | Swain et al. | |
| 2005/0244643 A1 | 11/2005 | Song et al. | |

FOREIGN PATENT DOCUMENTS

| WO | WO 0142385 | 6/2001 |
|---|---|---|
| WO | WO 2004016418 | 2/2004 |

OTHER PUBLICATIONS

Abstract of Japanese Publication No. JP03134598, Jun. 7, 1991.
Article—*Optical properties of lissamine functionalized Nd3+ complexes in polymer waveguides and solution*, Slooff et al., Optical Materials, vol. 14, 2000, pp. 101-107.
Article—*Performance Evaluation of the Phosphorescent Porphyrin Label: Solid-Phase Immunoassay of α-Fetoprotein*, O'Riordan et al., Analytical Chemistry, vol. 74, No. 22, Nov. 15, 2002, pp. 5845-5850.
Article—*Plastic Optical Fiber Lasers and Amplifiers Containing Lanthanide Complexes*, Kuriki et al., Chemical Reviews, vol. 102, No. 6, 2002, pp. 2347-2356.
Article—*Room-Temperature Phosphorescent Palladium-Porphine Probe for DNA Determination*, Roza-Fernández, et al., Analytical Chemistry, vol. 69, No. 13, Jul. 1, 1997, pp. 2406-2410.

\* cited by examiner

*Primary Examiner* — C. Melissa Koslow
(74) *Attorney, Agent, or Firm* — Dority & Manning, P.A.

(57) ABSTRACT

There is provided a lateral flow diagnostic device that employs a phosphorescent particle. The particle includes, for example, an organic phosphorescent material encapsulated in a cross-linked halogen-containing polymeric matrix. The cross-linked halogen-containing polymeric matrix has at least one percent by mass weight of halogen atoms, and the cross-linked halogen-containing polymeric matrix shields the encapsulated phosphorescent material from phosphorescence quenchers.

18 Claims, 4 Drawing Sheets

LATERAL FLOW DIAGNOSTIC DEVICE THAT CONTAINS A PHOSPHORESCENT MATERIAL ENCAPSULATED IN A CROSSLINKED POLYMER MATRIX

RELATED APPLICATIONS

The present application is a divisional of U.S. application Ser. No. 10/879,933, which was filed on Jun. 29, 2004.

BACKGROUND OF THE INVENTION

Phosphorescence is the result of a three-stage process. In the first stage, energy is supplied by an external source, such as an incandescent lamp or a laser, and absorbed by the phosphorescent compound, creating excited electronic triplet states (as opposed to fluorescence, which only has a singlet excited state). In the second stage, the excited states exist for a finite time during which the phosphorescent compound undergoes conformational changes and is also subject to a multitude of possible interactions with its molecular environment. During this time, the energy of the excited states is partially dissipated, yielding relaxed states from which phosphorescence emission originates. The third stage is the phosphorescence emission stage in which energy is emitted, returning the phosphorescence compound to its ground states. The emitted energy is lower than its excitation energy (light or laser) and thus of a longer wavelength. This shift or difference in energy or wavelength allows the emission energy to be detected and isolated from the excitation energy.

Quenching of phosphorescence is a phenomenon in which various reactants will bond with the triplet states and decrease the effective amount of phosphorescent compound available for use, thus interrupting the phosphorescent signal. Oxygen and water are strong quenchers of triplet states and may cause decay of the phosphorescence signal, thereby limiting its use in applications such as, for example, most practical biological assay applications. In order to obtain strong phosphorescence, oxygen often must be removed during the phosphorescence measurement.

One way to avoid oxygen quenching of the phosphorescence is to encapsulate phosphorescent molecules inside a solid matrix to shield them from quenchers such as oxygen and water molecules. Selection of the encapsulation matrix is important. The matrix should have relatively low oxygen permeability and have relatively high solubility of the phosphorescent molecules so that high loading of the phosphorescent molecules can be achieved and strong phosphorescence can be obtained. For many applications, mono-dispersed phosphorescent particles of different sizes are desired. In those cases, the matrices should be capable of forming mono-dispersed particles. For other applications, the phosphorescent particles may also be desired to have various surface functional groups to allow further surface modifications.

Different types of matrices have been used for encapsulation of phosphorescent molecules to form phosphorescent particles. These matrices include inorganic materials and polymers. Of the polymers used for encapsulation of phosphorescent molecules to form particles, polystyrene (PS) and polyacrylonitrile (PAN) and their derivatives have been commercially used. These polymeric systems, however, do not allow for maximal phosphorescence intensity at ambient conditions. Nor do the existing systems provide the ability to cross-link the encapsulated phosphorescent particles. The polystyrene matrix is not ideal for encapsulation of phosphorescent molecules because of the poor solubility of many phosphorescent molecules (sometimes referred to as "phosphorescent dye" or "dye") in polystyrene, which results in low dye loading and relatively low phosphorescence. The oxygen solubility of polystyrene is also believed to be relatively high. PAN and its derivatives have been found to have low oxygen permeability but they have limited solubility for many phosphorescent molecules as well, which also limits their application for encapsulation of those phosphorescent molecules.

There is a need for new matrix systems for the encapsulation of phosphorescent molecules to provide high phosphorescence intensity. The new matrix systems are cross-linked systems so they can be more stable than the non-cross-linked counterparts and are also more resistant to temperature, surfactants, and organic solvents.

SUMMARY OF THE INVENTION

The invention described here concerns the production of cross-linked phosphorescent micro- and nanoparticles and applications of those particles.

The invention uses halogen-containing polymers and co-polymers (HCPs) as an encapsulation matrix for organic and organometallic phosphorescent compounds to form micro- or nanoparticles. The phosphorescence of these encapsulated phosphorescent particles is substantially unaffected by phosphorescence quenchers such as oxygen and water molecules at ambient conditions.

The invention provides methods of making cross-linked phosphorescent particles. Cross-linked particles are more stable than the non-cross-linked counterparts and more resistant to temperature, surfactants, and organic solvents.

The invention also provides methods of making cross-linked particles with functionalizable surfaces which can function with biological molecules. Those phosphorescent micro/nanoparticles can find a wide variety of applications such as the detection of biological molecules and species in biological assays.

DETAILED DESCRIPTION OF THE INVENTION

The present invention relates to making cross-linked and surface functionalizable phosphorescent particles where the phosphorescent molecules are encapsulated by halogen-containing polymers and co-polymers (HCPs), to produce phosphorescent micro- and nanoparticles. The phosphorescence can be detected by a reader or detector. The invention also involves applications for the phosphorescent particles, particularly for biological applications such as detection of biological molecules and species.

"Encapsulation" as used herein includes a solution of a solid solute (such as a solid phosphorescent material) in a solid solvent (such as a polymer matrix). Such encapsulation may be generated by creating a liquid solution containing a liquid phosphorescent material and a liquid polymer and then co-precipitating the phosphorescent material and the polymer so that the solid phosphorescent material would be dispersed inside a matrix of the solid polymer material. The particles thus precipitated may be viewed as a solid solution of a phosphorescent material dissolved (or dispersed) in a solid polymer matrix solvent.

The term "halogen" herein refers to the elements of Group VII A of the Periodic Table and includes fluorine, chlorine, bromine and iodine. For purposes of the present invention, the term "halogen" also refers to molecules containing fluoride, chloride, bromide and iodide atoms and may include, but is not limited to, halogenated compounds such as halocarbons.

The term "halogen-containing polymer" and "halogen-containing co-polymer" (also called "HCPs") refers to a macromolecule formed by the chemical union of monomers at least a portion of which are halogen containing monomers. Exemplary HCPs include, but are not limited to, halogen-containing polyvinyl compounds, halogen-containing polyvinylidene compounds and various blends, mixtures and combinations thereof.

The methods and processes in the invention to produce the phosphorescent particles include the steps of: (1) dissolving halogen-containing polymers or co-polymers (HCPs) and phosphorescent molecules in a dissolving solvent with optional heating to make a first mixture; (2) mixing the first mixture with a precipitating solvent in which both the polymers and phosphorescent molecules have poor solubility to make a second mixture; (3) washing the formed particles; and (4) drying the particles or suspending the particles in storage solvents.

HCPs such as polyvinyl fluoride (PVF) and polyvinyl chloride (PVC) have been found to provide high loading of many phosphorescent molecules, such as metal chelates with organic ligands, which often have poor solubility in most organic solvents and solid matrices. HCPs, just like carbon halide solvents such as chloroform and methylene chloride, have very good compatibility with many organic compounds, including metal chelates with organic ligands. Although the present invention should not be held to any particular theory of operation, it is believed that the use of HCPs as encapsulation matrices can increase loading, reduce molecular aggregation and increase the homogeneous distribution of the encapsulated molecules in the matrices, features which are extremely beneficial when phosphorescent particles of high phosphorescence intensity are desired. In contrast, the use of a matrix with poor compatibility and solubility with the encapsulated phosphorescent molecules most likely will result in the molecular aggregation, low phosphorescence intensity and possible distortion of their spectral properties.

Figure 1:
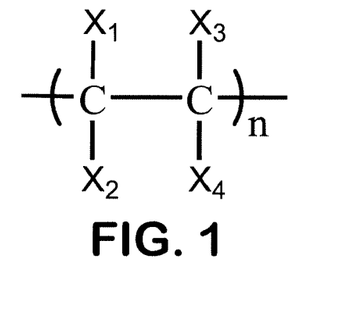
FIG. 1 is a diagram of a halogen-containing polymer.

The HCPs should have at least one percent by mass weight of halogen atoms. The HCPs can have a general structure as shown in FIG. 1, in which the halogen content is desirably between 5 and 80 weight percent, more desirably between 10 and 60 weight percent. In the structure of FIG. 1, at least one of X1-X4 contains one or more halogen atoms. The others among X1-X4 can be other atoms or groups, such as hydrogen atoms and methyl groups. Some specific examples of HCPs include, but are not limited to, polyvinyl fluoride (PVF), polyvinyl chloride (PVC), polyvinyl bromide (PVB), polyvinyl iodide (PVI), polyvinylidene fluoride, polyvinylidene chloride, polyvinylidene bromide, polyvinylidene iodide, and their derivatives.

Figure 2:
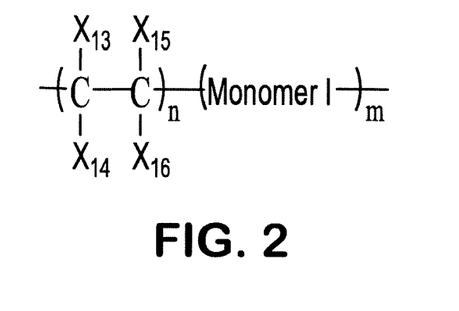
FIG. 2 is a diagram of a halogen-containing co-polymer.

The halogen-containing co-polymers can have a general structure as shown in FIG. 2, in which the halogen content of the polymer is between 5 and 80 weight percent, more desirably between 10 and 60 weight percent. At least one of X13-X16 contain one or more halogen atoms and monomer I represents, for example, ethylene, propylene, or other chemical moieties.

Figure 3:
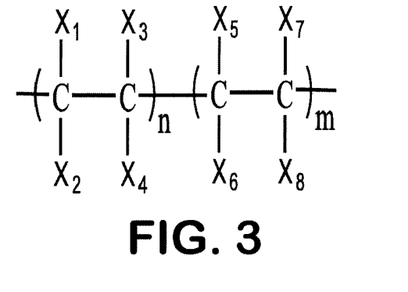
FIG. 3 is a diagram of a halogen-containing co-polymer.

Co-polymers with a general structure of FIG. 3 are more desirable, in which at least one of X1-X4 contains one or more halogen atoms. The others among X1-X4 can be other atoms or groups, such as hydrogen atoms and methyl groups. In the structure of FIG. 3, at least one of X5-X8 is a hydrophilic group. Examples of hydrophilic groups include, but are not limited to, carboxylic acid groups, ethanolamine groups, hydroxyl groups, amine and amino groups, imine group and polyethylene glycol groups. Specific examples of the halogen-containing co-polymers include, but are not limited to, co-polymers of vinyl fluoride, vinyl chloride, vinyl bromide and vinyl iodide with other monomers such as acrylic acid and methacrylic acid. The halogen-containing monomer is desirably a significant portion (greater than 50 weight percent) of the co-polymers.

Figure 4:
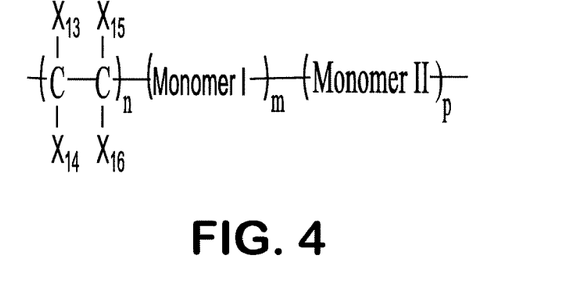
FIG. 4 is a diagram of a halogen-containing co-polymer.
Figure 5:
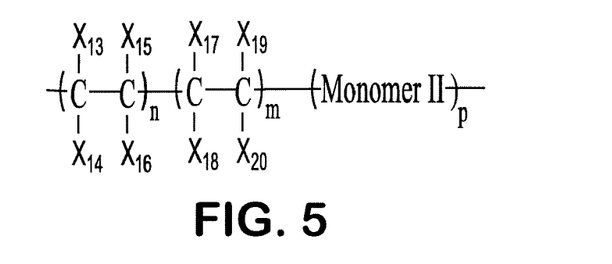
FIG. 5 is a diagram of a halogen-containing co-polymer.

The halogen-containing co-polymers can also have a general structure as shown in FIGS. 4 and 5, in which the halogen content is between 5 and 80 weight percent, more desirably between 10 and 60 weight percent. The co-polymers consist of at least three different monomers in which the monomers with halogen content (X13-X16) are preferred to be the major components (greater than 50 weight percent). Two of the three monomers can be the same as the monomers in the co-polymers shown in FIG. 2 and the other monomer can be varied, based on the desired characteristics of the particles. In the structure of FIG. 5, at least one of X17-X20 is a hydrophilic group as generally discussed above.

The phosphorescent molecules which may be used for encapsulation by the halogen-containing polymers and co-polymers can have various structures. They can be organic compounds, organic/inorganic hybrid materials, and metal chelates with organic ligands. Phosphorescent molecules suitable for encapsulation include, but are not limited to, platinum, palladium, ruthenium, osmium, iridium, indium, molybdenum, technetium, copper, iron, chromium, tungsten, zinc and rhenium which may be complexed with various ligands. Ligands useful in such complexing include porphyrins and their derivatives, porphine and its derivatives, polypyridyl and its derivatives, pyridine, pyrazine, isonicotinamide, imidazole, bipyridine, terpyridine, phenanthroline and dipyridophenazine.

Suitable ligands may be substituted with alkyl, substituted alkyl, aryl, substituted aryl, aralkyl, substituted aralkyl, carboxylate, carboxaldehyde, carboxamide, cyano, amino, hydroxy, imino, hydroxycarbonyl, aminocarbonyl, amidine, guanidinium, ureide, sulfur-containing groups, phosphorus containing groups, and the carboxylate ester of N-hydroxysuccinimide.

Porphyrins and porphine metal complexes possess pyrrole groups coupled together with methylene bridges to form cyclic structures with metal chelating inner cavities. Many of these molecules exhibit strong phosphorescence properties at room temperature in suitable solvents (e.g., water) and an oxygen-free environment. Some suitable porphyrin complexes that are capable of exhibiting phosphorescent properties include, but are not limited to, platinum (II) coproporphyrin-I and III, palladium (II) coproporphyrin, ruthenium coproporphyrin, zinc(II)-coproporphyrin-I, derivatives thereof, and so forth. Similarly, some suitable porphine complexes that are capable of exhibiting phosphorescent properties include, but are not limited to, platinum(II) tetra-meso-fluorophenylporphine and palladium(II) tetra-meso-fluorophenylporphine.

As indicated above, bipyridine metal complexes may also be utilized in the present invention. Some examples of suitable bipyridine complexes include, but are note limited to, bis[(4,4'-carbomethoxy)-2,2'-bipyridine]2-[3-(4-methyl-2,2'-bipyridine-4-yl)propyl]-1,3-dioxolane ruthenium (II); bis (2,2'-bipyridine)[4-(butan-1-al)-4'-methyl-2,2'-bi-pyridine] ruthenium (II); bis(2,2'-bipyridine)[4-(4'-methyl-2,2'-bipyridine-4'-yl)-butyric acid]ruthenium (II); tris(2,2'-bipyridine)ruthenium (II); (2,2'-bipyridine) [bis-bis(1,2-diphenylphosphino)ethylene]2-[3-(4-methyl-2,2'-bipyridine-4'-yl)propyl]-1,3-dioxolane osmium (II); bis(2,2'-bipyridine)[4-(4'-methyl-2,2'-bipyridine)-butylamine] ruthenium (II); bis(2,2'-bipyridine)[1-bromo-4(4'-methyl-2,2'-bipyridine-4-yl)butane]ruthenium (II); bis(2,2'-bipyridine)maleimidohexanoic acid, 4-methyl-2,2'-bipyridine-4'-butylamide ruthenium (II), and so forth.

The dissolving solvents should have very good solubility for both the encapsulating polymer/copolymers and the phosphorescent molecules. The dissolving solvents can be a single chemical species or mixtures of several chemicals. Examples of the dissolving solvents include, but are not limited to, dimethylformamide (DMF), dimethylsulfoxide (DMSO), tetrahydrofurane (THF), methanol, ethanol, propanol, pentane, pentene, hexane, methyl ethyl ketone, acetone, acetonitrile, methylene chloride, cyclohexane, chloroform, and mixtures thereof.

The precipitating solvents should have poor solubility for both polymers/co-polymers and phosphorescent molecules and may be polar or non-polar. The precipitating solvents can also be one chemical species or mixtures of several chemicals. The precipitating solvents may be chosen from the same listing as the dissolving solvent though of course they may not be the same chemical in any particular instance. E.g., if water were used as the dissolving solvent it cannot be used as the precipitating solvent.

Selection of the dissolving solvents and precipitating solvents depends not only upon the characteristics of HCPs and phosphorescent molecules, but also surface properties and sizes of the particles desired. The dissolving solvents may or may not be completely miscible with each other.

Platinum and palladium tetramethyl pentafluorophenyl porphine (Pt-TMFPP and Pd-TMFPP from Frontier Scientific Inc., Logan, Utah, USA) were chosen as phosphorescent compounds for encapsulation herein. In the presence of oxygen or air, the two compounds have very weak phosphorescence. In the absence of oxygen, they exhibit very strong phosphorescence at about 650 nm for Pt-TMFPP and about 670 nm for Pd-TMFPP when they are excited at about 390 nm. These two phosphorescent molecules are soluble in many organic solvents such as toluene, benzene, methanol, DMF and DMSO, but are not soluble in water.

Cross-linking of polymers is a useful method of providing enhanced structural integrity. Such cross-linked phosphorescent molecules are more stable than their non-cross-linked counterparts and so more resistant to temperatures, chemicals, organic solvents and the like.

HCPs may be directly cross-linked through linking moieties that are a part of the polymer, or cross-linked through other separate bridging or cross-linking materials. Examples include, but are not limited to unsaturated polymers made from unsaturated dicarboxylic acids like maleic anhydride, maleic acid, fumaric acid and itaconic acid, unsaturated polymers like polydiethylene glycol-bis(allyl carbonate, polyimides and polybismaleic imides, homo-bifunctional cross-linkers which have two identical reactive ends like bis (sulfosuccinimidyl)suberate, disuccinimidyl tartrate and disulfosuccinimidyl tartrateother, ghetero-bifunctional crosslinkers which have two dissimilar reactive ends like m-maleimidobenzoyl-N-hydroxysuccinimide ester, [N-(E maleimidocaproyloxy)-succinimide], and maleimide PEG hydrazide polymers or small molecules which are capable of cross-linking halogen-containing polymers, other linking moieties can include ethanolamine groups, hydroxyl groups, amine groups, amino groups, imine groups or polyethylene glycol groups. Another method of cross-linking, through the use of two or more HCPs where at least one is the major encapsulating matrix and one or more is a cross-linking polymer has yielded very stable particles.

Yet another method of cross-linking, in which the polymeric system consists of one or more HCPs containing block copolymers and one or more small cross-linking molecules is also within the scope of the invention. The block copolymers can be random and block. The block co-polymer can be selected from di-blocks, tri-blocks, star-blocks and multi-blocks. The arrangement of blocks to blocks can be head to end, head to head, end to end and end group captured. At least one of the co-polymers should have hydrophilic functional groups to provide biological agent binding. Examples include but are not limited to copolymers formed by monomers between methylmethacrylate and maleic anhydride, maleic diethylester and fumaric diethylester.

Another method of cross-linking the particles is through the use (e.g., covalent bonding) of a cross-linking phosphorescent material which may be encapsulated by a halogen-containing polymer. Another method is to use a halogen-containing phosphorescent material and a separate cross-linking material. Examples include but are not limited to separate cross-linking materials which are primary amine reactive cross-linkers like imidoester and N-hydroxysuccinimide-esters, sulhydryl reactive cross-linkers like maleimides, haloacetyls and pyridyl disulfides, carbonyl reactive cross-linkers like hydrazides, carbodiimides, and photoreactive cross-linkers like p-azidobenzoyl hydrazide, 4-(p-azidosalicylamido) butylamine and N-hydroxysuccinimidyl-4-azidosalicylic acid. Lastly, a cross-linking, halogen-containing phosphorescent material may be used.

Cross-linking of the particles may be carried out by methods known in the art, such as by heat, photo-initiation and free radical cross-linking.

Products in which the cross-linked particles may be used include imaging machines, fluorocytometers and diagnostic devices. Examples include but are not limited to—qualitative and/or quantitative lateral flow, spot tests/indicator system, latex agglutination tests, filter separation tests, particle-based ELISA tests, flow cytometry, cell staining or related methods, blot or gel staining and microarray.

Examples of the copolymers useful for producing cross-linkable phosphorescent particles include, but are not limited to, copolymers of poly(vinyl chloride) with acrylic acid, maleic acid, vinyl pyridinium, monomers with amino and imine groups, and monomers with sulfonate groups. Other moieties suitable for use as functional groups include epoxy groups, isocyanate groups, melamine groups metal alkoxides, carboxyl groups, hydrolyzable organosilyl groups, and beta-ketoester groups.

One example of the HCP and the copolymers is vinyl halide copolymerized with unsaturated compounds and/or saturated monomers. Examples of these monomers include but are not limited to carboxyl acid, acrylic, methacrylic and vinyl acetate.

One type of polymeric system for encapsulation of phosphorescent particles is composed of epoxy-functional terpolymers made from vinyl chloride, vinyl acetate, and epoxy-containing monomers and maleic acid-modified vinyl polymers and copolymers.

One type of halogen-containing co-polymer useful for encapsulation of phosphorescent molecules may be expressed, for example, as poly(vinyl chloride)-(monomer I)-(monomer II) and is illustrated in FIGS. 4 and 5. It is believed that the vinyl chloride portion provides good compatibility and high solubility for hydrophobic molecules such as Pd-TMFPP and Pt-TMFPP. The monomer I portion is desirably hydrophilic to provide surface functional groups, and the monomer II portion can be used for other purposes such as cross-linking. Specific examples of such copolymers are poly(vinyl chloride-co-vinyl acetate-co-maleic acid) (PVCMA) to provide phosphorescent particles with carboxylic acid on the surface and poly(vinyl chloride-co-vinyl acetate-co-epoxy monomer) (PVCEM).

Figure 6:
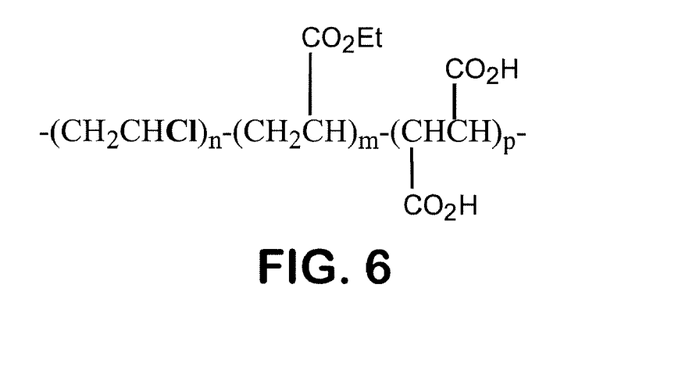
FIG. 6 is a diagram of poly(vinyl chloride-co-vinyl acetate-co-maleic acid) (PVCMA).

The PVCMA (FIG. 6) that was used in some examples contained 81% vinyl chloride, 17% vinyl acetate and 2% maleic acid. The maleic acid can provide surface functional groups and water-compatibility and vinyl acetate can be used for cross-linking. PVCMA was found to provide an excellent matrix for high loading of Pt-TMFPP and act as a shield from oxygen, which results in very high phosphorescence intensity of the particles. PVCMA is available commercially from the Dow Chemical Company of Midland, Mich. under the trade name UCAR™ VMCA Solution Vinyl Resin.

Figure 7:
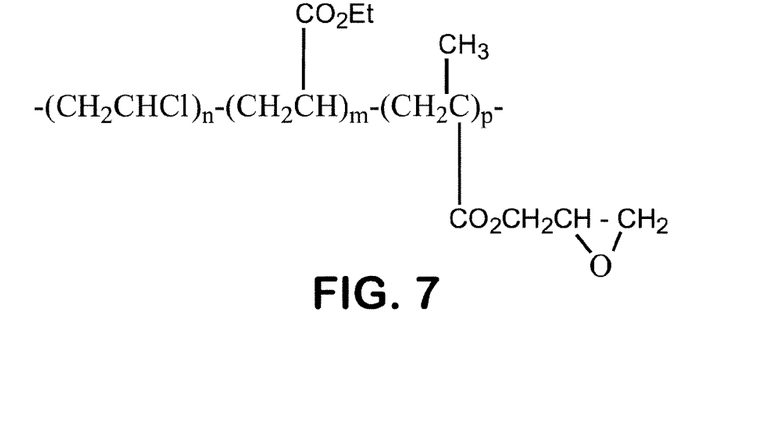
FIG. 7 is a diagram of poly(vinyl chloride-co-vinyl acetate-co-epoxy monomer) (PVCEM).

The PVCEM (FIG. 7) that was used in some Examples contained 82% vinyl chloride, 9% vinyl acetate and 9% epoxy monomer. PVCEM is available commercially from the Dow Chemical Company under the trade name UCAR™ VERR-40.

Phosphorescent particles with surface functional groups can be produced by the present invention by using halogen-containing co-polymers. Surface functional groups provide the particles with the ability to interact with other materials by making them chemically reactive, for example, by being hydrophilic, hydrophobic, acidic, basic, etc. The co-polymers have at least two different monomers, one which has halogen atom(s) and is hydrophobic, such as vinylchloride, and the other which desirably has hydrophilic groups such as methacrylate acid, acrylic acid, ethanolamine, polyethylene glycol (PEG), pyridine side chains, ammonium side chains or others.

In the case of hydrophilic functional groups, In order for some of the hydrophilic monomers to stay at the particle surfaces, water or water mixing solvents are desirable as the precipitating solvent. In such a case, the hydrophobic portion containing halogen atoms forms the particle core along with the encapsulated hydrophobic phosphorescent molecules, and a portion of the hydrophilic groups sit at the interface where the hydrophobic core phase and hydrophilic phase are separated.

To make the surface functionalized particles, the polymers and the phosphorescent molecules such as Pt-TMFPP and Pd-TMFPP are dissolved in a water-miscible solvent such as DMF or THF. Depending on the particle size desired, the solution may be added to water under stirring or alternatively, water can be added to the solution to co-precipitate the polymers and phosphorescent molecules. The particles formed can be further processed or analyzed.

The mechanical stability and hydrophilic surfaces of the particles are indicated by several characteristics of the particles; the particles can be easily precipitated and are re-suspended in water for many cycles without size change. In addition, the surface functional groups have been confirmed by co-valently attaching antibodies to the particles using carbodiimide as a coupling reagent.

The antibody-coated phosphorescent particles have been used to detect c-reactive protein (CRP) using time-resolved phosphorescence measurements on lateral flow diagnostic devices. The detection sensitivity achieved by the particles is very high. The invention may be better understood through the following examples. All water used in the examples was filtered and de-ionized.

EXAMPLES

Step 1—Solution Preparation: 5 mg/ml solutions of PVCEM (Dow's UCAR VERR-40) and PVCMA (Dow's UCAR VMCA) were prepared by dissolving 125 mg of each polymer into 25 ml of THF, acetone, DMF and DMSO in eight separate vials, respectively. The vials were stirred and heated briefly to ensure complete dissolution of the polymers. Mixed 600 μl solutions of PVCEM and PVCMA were prepared at various ratios by weight of 0/100, 20/80, 50/50, 80/20 and 100/0. While stirring each mixed solution vigorously, 3 ml of water was added dropwise to each vial, causing particles to form. The particle size was measured using a ZetaPALS Particle Size Analyzer (Brookhaven Instruments, Co., Holtsville, N.Y.). For the measurements, 2.20 was used for refractive index of particles and 90° angle was used. The particle size and polydispersity (nm/PD) results are given in Table 1.

TABLE 1

| Particle Size and Polysipersity (nm/PD) | | | | | |
|---|---|---|---|---|---|
| | PVCEM/PVCMA Ratio | | | | |
| | 0/100 | 20/80 | 50/50 | 80/20 | 100/0 |
| THF | 113/0.050 | 133/0.085 | 97/0.081 | 73/0.193 | 184/0.093 |
| DMF | 99/0.373 | 78/0.190 | 73/0.210 | 89/0.339 | Too big to detect |
| Acetone | 63/0.093 | 105/0.080 | 72/0.177 | 92/0.112 | 368/0.054 |
| DMSO | 76/0.354 | 133/0.336 | 82/0.281 | 89/0.260 | 158/0.103 |

Figure 8:
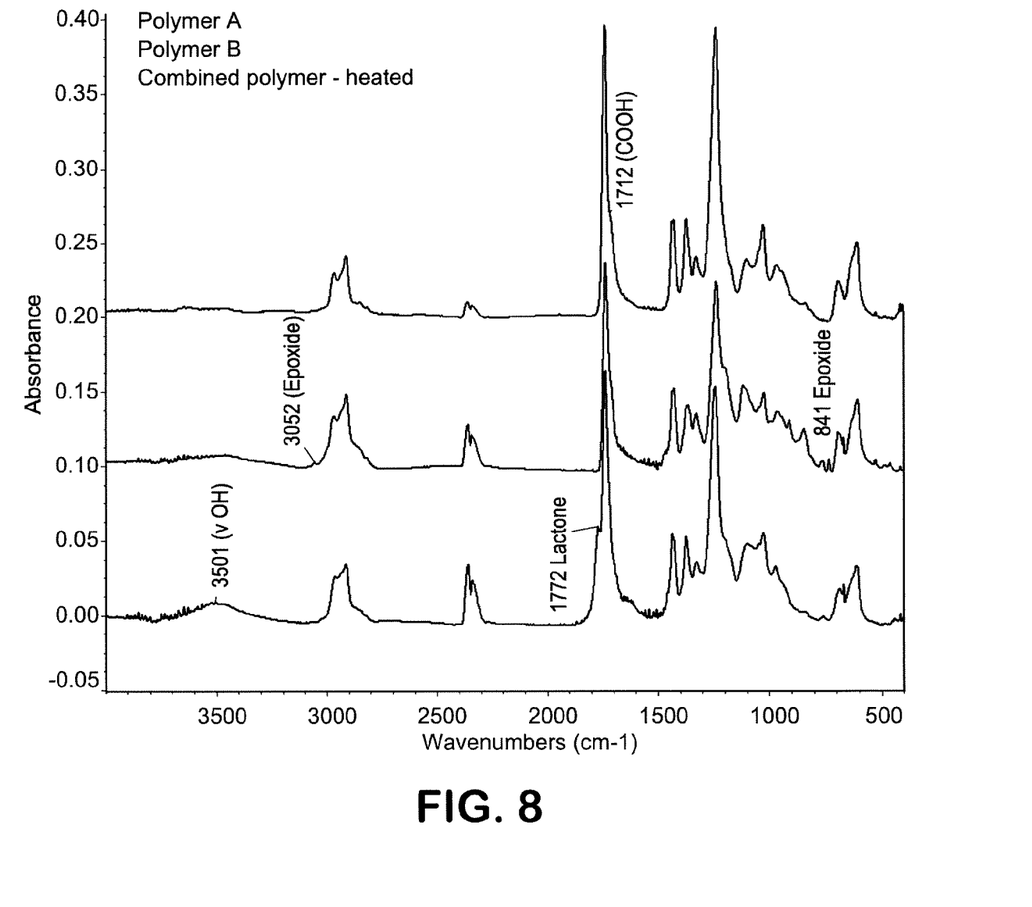
FIG. 8 is a diagram of FTIR Spectrum for PVCMA, PVCEM, and Cross-linked 20/80 PVCEM/PVCMA particles.

Step 2—Particle Crosslinking: The 20/80 PVCEM/PVCMA solution in THF was heated at 150° C. for 20 minutes in order to cross-link it. After heating, infra-red (IR) analysis was performed and the spectrum compared to each component's pure spectrum. FIG. 8 shows the three spectra and indicates that cross-linked particles were successfully made. In FIG. 8, the uppermost line is PVCMA, the middle line is PVCEM and the lowest line is the cross-linked PVCEM/PVCMA. The scale in FIG. 8 on the y axis is absorbance in nm and on the x-axis is the wave number in $cm^{-1}$.

Step 3—Phosphorescent Dye Encapsulation: Platinum tetramethyl pentafluorophenyl porphine (Pt-TMFPP) was chosen for encapsulation. 4 mg/ml of Pt-TMFPP solution was made by dissolving 20 mg of the dye powder in 5 ml DMF. Different amounts of this dye solution as indicated in Table 2 were added to 600 ul of the 20/80 mixed PVCEM/PVCMA solution. While stirring mixed solution vigorously, 3 ml of water was added dropwise to each vial, causing dye encapsulated particles to form. This mixture was heated at 150° C. for 20 minutes in order to cross-link it and particles size and polydispersity measured in the same manner as above. The results are given in Table 2.

TABLE 2

Particle Size and Polydispersity (nm/PD) for Dye Particles

| Dye % | 0.10% | 0.50% | 1.00% | 2.00% |
|---|---|---|---|---|
| nm/PD | 119/0.005 | 134/0.012 | 124/0.005 | 132/0.005 |

Step 4—Mechanical Stability: The particles made in Step 3 were placed into 1.5 ml vials and centrifuged at 14,000 rpm for 20 minutes. The supernatant was discarded and a volume of water equal to that discarded was added to each vial. The vials were placed in an ultrasonic bath for 5 minutes to re-suspend the particles and then the vials were placed in an oven at 85° C. overnight (about 10 hours) to crosslink them. The particle size and polydispersity were measured as above and the results given in Table 3 and show that the particles did not disintegrate into smaller particles, thus showing good mechanical stability.

TABLE 3

Particle Size and Polydispersity (nm/PD) For Washed and X-linked 20/80 PVCEM/PVCMA Dye Particles

| Dye % | 0.10% | 0.50% | 1.00% | 2.00% |
|---|---|---|---|---|
| nm/PD | 187/0/005 | 199/0.005 | 192/0.040 | 126/0.048 |

Step 5—Phosphorescent Intensity: 20 µl of each of the suspensions prepared in Step 4 was diluted with 500 µl distilled water for measurement of phosphorescent intensity. The instrument used was a Fluorolog SPEX 1934D phosphorimeter (from JoBin Yvon Horiba, Edison, N.J.) The parameters used in the measurements were; excitation light at 390 nm, phosphorescence at 650 nm, number of scans was 1, initial delay was 0.01 ms, the sample window was 3 ms, the time per flash was 50 ms and the number of flashes was 20. The results are given in units of thousand photon counts (k).

As a comparison, a 5 mg/ml poly(acrylonitrile) (PAN) solution made with 125 mg PAN in DMF was made for comparison. This solution was used to encapsulate Pt-TM-FPP in the method taught in Step 3. In addition, a solution without any polymer was produced as a control.

Figure 9:
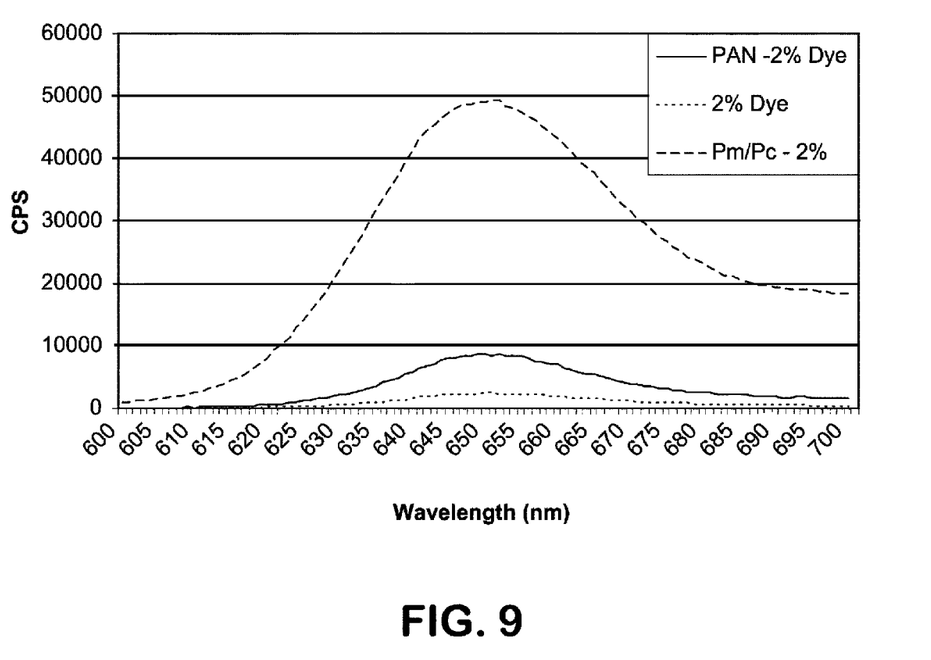
FIG. 9 is a diagram of comparison of Phosphorescent Intensities of 2% Pt-TMFPP Encapsulated by PAN, 20/80 PVCEM/PVCMA and control.

FIG. 9 shows the intensity of the dye particles encapsulated by the polymers. The uppermost line is that of the PVCEM/PVCMA system, the middle line is that of the PAN system and the lowest line is that of the phosphorescent material alone. The scale on the X axis is 600 to 700 wavelength and the Y axis is 0 to 60000 counts per second. It's clear that the PVCEM/PVCMA system had much higher intensity than that of PAN or the control.

The following Table 4 shows the intensity of the dye particles encapsulated by the polymers. It's clear that the PVCEM/PVCMA system had much higher intensity than that of PAN when compared at same level of dye concentrations varying from 0.1% to 2.0%.

TABLE 4

| Dye % | 0.10% | 0.50% | 1% | 2% |
|---|---|---|---|---|
| PAN | 6357.3 | 6443.2 | 7770.6 | 8701.1 |
| PVCEM/PVCMA | 24,209 | 35,910 | 44543 | 49014 |

Step 6—Chemical Resistance: The particles made in Step 3 were placed into 1.5 ml vials and centrifuged at 14,000 rpm for 20 minutes. The supernatant was discarded and a volume of water equal to that discarded was added to each vial. The vials were placed in an ultrasonic bath for 5 minutes to re-suspend the particles. Then the re-suspended particles were divided into two parts with equivalent amounts. One part was placed in an oven at 85° C. overnight (about 10 hours) to crosslink them. The other part was used as un-cross-linked particles. An excess amount of organic solvent like DMSO or THF was added into the cross-linked and un-cross-linked particle solutions. After the solutions rested for 10 minutes, the particle size and polydispersity were measured as in step 1 and the results given in the Tables 5 and 6 below. Results show that the uncross-linked dye particles swelled into bigger particles while in contact with DMSO or THF insult respectively, which resulted in a much wider particle size distribution (PD), while the cross-linked dye particles showed much less effect of DMSO from THF, indicating good chemical resistance for cross-linked dye particles.

TABLE 5

| | PD | STD | Size (nm) | STD |
|---|---|---|---|---|
| Uncross-linked Dye Particles | | | | |
| 50% DMSO | 0.167 | 0.020 | 121 | 1.50 |
| 67% DMSO | 0.349 | 0.154 | 160 | 10.00 |
| 90% DMSO | 3.22 | 1.075 | 400 | 35.00 |
| Cross-linked Dye Particles | | | | |
| 50% DMSO | 0.057 | 0.019 | 131 | 2.80 |
| 67% DMSO | 0.005 | 0.005 | 136 | 5.50 |
| 90% DMSO | 0.088 | 0.045 | 166 | 4.20 |

TABLE 6

| | PD | STD | Size (nm) | STD |
|---|---|---|---|---|
| Uncross-linked Dye Particles | | | | |
| 50% THF | 0.232 | 0.039 | 174 | 5.70 |
| Cross-linked Dye Particles | | | | |
| 50% THF | 0.088 | 0.024 | 139 | 15.50 |

Step 7—Surfactant Resistance: The particles made in Step 3 were placed into 1.5 ml vials and centrifuged at 14,000 rpm for 20 minutes. The supernatant was discarded and a volume of water equal to that discarded was added to each vial. The vials were placed in an ultrasonic bath for 5 minutes to re-suspend the particles. Then the re-suspended particles were divided into two equal parts. One part was placed in an oven at 85° C. overnight (about 10 hours) to crosslink the particles. The other part was used as uncross-linked particles. An excess amount of surfactant (e.g. TWEEN® 20) was added to the cross-linked and uncross-linked particle solutions. After the solutions rested for 10 minutes, the particle size and polydispersity were measured as in step 1 and the results given in Table 7. The results show that the un-cross-linked dye particles broke into smaller particles with an average particle size is around 42 nm with the addition of 2% TWEEN® 20 surfactant, which also resulted in a much wider particle size distribution (PD=0.326), while the cross-linked dye particles were virtually unaffected (average particle size of around 123 nm) and narrow size distribution (PD=0.167). This indicates the cross-linked particles had good surfactant resistance.

TABLE 7

| Add 2% TWEEN ® 20 | PD | STD | Average Size (nm) | STD |
|---|---|---|---|---|
| Uncross-linked Dye Particles | 0.326 | 0.014 | 42 | 4 |
| Cross-linked Dye Particles | 0.167 | 0.064 | 123 | 5 |

Figure 10:
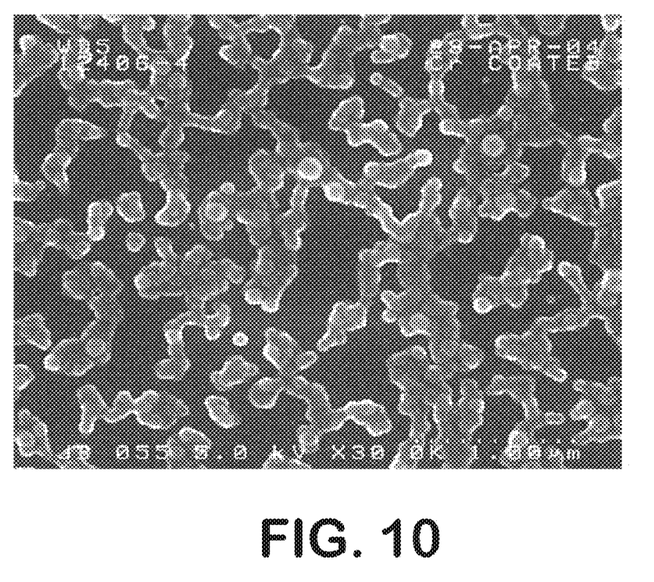
FIG. 10 is an SEM image of uncross-linked PVCMA/PVCEM Pt-TMFPP particles.
Figure 11:
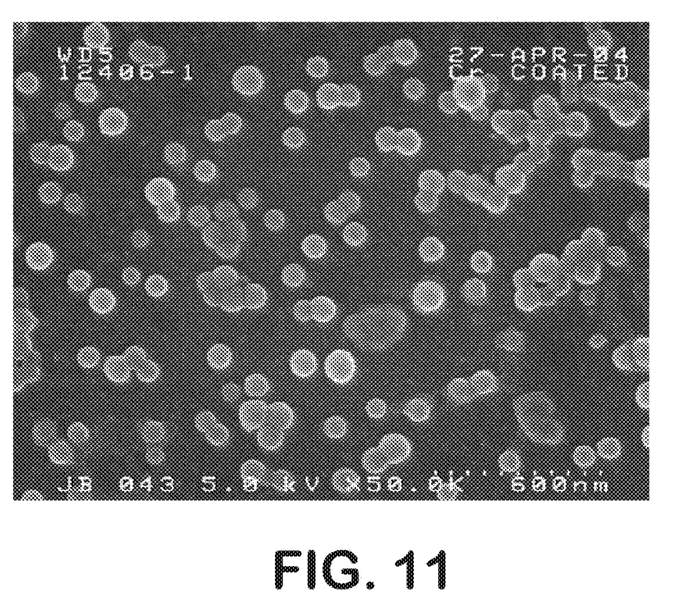
FIG. 11 is an SEM image of cross-linked PVCMA//PVCEM Pt-TMFPP particles.

SEM results: The SEM images for the cross-linked and non cross-linked dye encapsulated particles from step 5 are shown in FIGS. 10 and 11. The average sizes of the particles from the SEM images are similar to the sizes obtained by ZetaPALS Particle Size Analyzer. The cross-linked particles showed very uniform and stabilized round particle morphology, while some of the un-cross-linked particles aggregated and fused together, resulting in less uniform particle morphology.

Step 8—Photostability: 50 ul cross-linked phosphorescent molecule Pt-TMPFP encapsulated dye encapsulated particles from step 3 (dye concentrations are 0.1%, 0.5%, 1.0% and 2.0% respectively) were washed once by water and re-suspended in 450 ul water. The particles were continuously irradiated with 390 nm light and the phosphorescence imonitored at 650 nm by a Fluorolog III fluorimeter. Less than 2% phosphorescence is diminished after 10 minutes irradiation. The experiments indicate that the cross-linked phosphorescence particles with different dye loadings are all very stable photochemically.

Step 9—Covalent conjugation of antibody to cross-linked phosphorescent particles: 6 ml of cross-linked phosphorescent molecule Pt-TMPFP encapsulated particles from step 3 (dye concentration is 0.1%) was washed once by water, then by phosphate buffered saline (PBS) (Polysciences, Inc) through centrifugation. The washed particles were suspended in 500 ul PBS by bath-sonication (10 mins) followed by 10 s of probe-sonication. To the particle suspension was added with 3 mg carbodiimide in 50 ul PBS and the mixture was shaken for 15 mins. The particles were then washed twice by borate buffer through centrifugation and the washed particles were suspended in 400 ul borate buffer. To the particle suspension was added with 35 ul CRP monoclonal antibody (6.4 mg/ml, CRP Mab1 from BioSpacific, A5811)) and the mixture was shaken overnight. To the mixture was then added with 200 ul ethanoamine (Polysciences, Inc) and 50 ul bovine serum albumin (BSA) (1 mg/ml) and the mixture was shaken for half hour. Then the particles were washed twice by hepes buffer (N-[2-hydroxyethyl]piperazine-N'-(2-ethanesulfonic acid) from Sigma-Aldrich Chemical Co., Inc. of St. Louis, Mo., pH: 7.4). The washed particles were suspended in 1000 ul Hepes containing 0.02 mg/ml BSA by 10 mins of bath-sonication, followed by 10 s probe-sonication. The suspended particles were stored at 4° C.

Step 10—Detection of CRP using conjugates: 20 ul of conjugates prepared in step 9 was diluted with 180 ul TBS buffer with 1% TWEEN® 20 to prepare conjugate suspension. In each of eleven wells on a microtiter plate was added with 20 ul of the conjugate suspension. CRP (from Biodesign Inc.) is diluted in tris-buffered saline (TBS). The well is labeled as well 1, 2, 3, and 4 respectively. To well 1, 2, 3 and 4 was added with 20 ul TBS, 19 ul TBS and 1 ul CRP (12.5 ng/ml), 18 ul TBS and 2 ul CRP (25 ng/ml), and 15 ul TBS and 5 ul CRP (62.5 ng/ml), respectively. To each of the wells was inserted with a half dipstick with 1 mg/ml CRP Mab2 detection line (CRP Mab2: CRP monoclonal antibody, A5804, from BioSpacific Inc) and goldline control line. The dispsticks were allowed to develop for half hour. The phosphorescence at 650 nm on the detection line of each device was then measured on Fluorolog III by exciting at 390 nm. The phosphorescence intensity at 650 nm for the device in well 1 to 4 is 10.4K, 24.1K, 29.9K and 39.5K, respectively. The phosphorescent moiety is believed to be covalently bonded with the polymeric matrix.

As will be appreciated by those skilled in the art, changes and variations to the invention are considered to be within the ability of those skilled in the art. Examples of such changes are contained in the patents identified above, each of which is incorporated herein by reference in its entirety to the extent it is consistent with this specification. Such changes and variations are intended by the inventors to be within the scope of the invention. It is also to be understood that the scope of the present invention is not to be interpreted as limited to the specific embodiments disclosed herein, but only in accordance with the appended claims when read in light of the foregoing disclosure.

What is claimed is:

1. A lateral flow diagnostic device comprising a phosphorescent particle, the particle including an organic phosphorescent material encapsulated in a cross-linked halogen-containing polymeric matrix, wherein the cross-linked halogen-containing polymeric matrix has at least one percent by mass weight of halogen atoms, and wherein the cross-linked halogen-containing polymeric matrix shield the encapsulated phosphorescent material from phosphorescent quenchers.

2. The lateral flow diagnostic device of claim 1, wherein the cross-linked halogen-containing polymeric matrix is formed by cross-linking one halogen-containing polymer through linking moieties.

3. The lateral flow diagnostic device of claim 2, wherein the linking moieties are carboxylic acid groups, ethanolamine groups, hydroxyl groups, amine groups, amino groups, imine group, epoxy groups, isocyanate groups, melamine groups, metal alkoxides, hydrolysable organosilyl groups, beta-ketoester groups, polyethylene glycol groups, or combinations thereof.

4. The lateral flow diagnostic device of claim 1, wherein the cross-linked halogen-containing polymeric matrix is formed by cross-linking two or more polymers through linking moieties, wherein at least one of the polymers has halogen atoms.

5. The lateral flow diagnostic device of claim 4, wherein at least one of the polymers is poly (vinyl chloride-co-vinyl acetate-co-maleic acid).

6. The lateral flow diagnostic device of claim 4, wherein at least one of the polymers is poly(vinyl chloride-co-vinyl acetate-co-epoxy monomer).

7. The lateral flow diagnostic device of claim 4, wherein at least one of the polymers is a block copolymer.

8. The lateral flow diagnostic device of claim 1, wherein the halogen atoms include fluoride, chloride, bromide, iodide, or combinations thereof.

9. The lateral flow diagnostic device of claim 1, wherein the cross-linked halogen-containing polymeric matrix has between about 5 and 80 weight percent halogen atoms.

10. The lateral flow diagnostic device of claim 1, wherein the cross-linked halogen-containing polymeric matrix has between about 10 and 60 weight percent halogen atoms.

11. The lateral flow diagnostic device of claim 1, wherein the cross-linked halogen-containing polymeric matrix is formed by cross-linking poly(vinyl chloride-co-vinyl acetate-co-epoxy monomer) and poly(vinyl chloride-co-vinyl acetate-co-epoxy monomer).

12. The lateral flow diagnostic device of claim 1, wherein the phosphorescent material is covalently bonded with the polymeric matrix.

13. The lateral flow diagnostic device of claim 1, wherein the particle is a nanoparticle.

14. The lateral flow diagnostic device of claim 1, wherein the particle is covalently conjugated with a monoclonal antibody for C-reactive protein.

15. The lateral flow diagnostic device of claim 1, wherein the organic phosphorescent material is a phosphorescent organometallic molecule or compound.

16. The lateral flow diagnostic device of claim 1, wherein the organic phosphorescent material is an organic/inorganic hybrid phosphorescent material.

17. The lateral flow diagnostic device of claim 1, wherein the organic phosphorescent material is a metal chelate including organic ligands.

18. The lateral flow diagnostic device of claim 1 wherein the organic phosphorescent material includes porphyrin metal complexes, porphine metal complexes, pyridine metal complexes, or combinations thereof.

* * * * *